Aug. 23, 1932.  E. S. PATCH  1,873,146

ENGINE COOLING SYSTEM

Filed Nov. 28, 1930

Inventor
Earl S. Patch
By Spencer Hardman & Fehr
his Attorneys

Patented Aug. 23, 1932

1,873,146

UNITED STATES PATENT OFFICE

EARL S. PATCH, OF DAYTON, OHIO, ASSIGNOR TO MORAINE PRODUCTS COMPANY, OF DAYTON, OHIO, A CORPORATION OF OHIO

ENGINE COOLING SYSTEM

Application filed November 28, 1930. Serial No. 498,739.

This invention relates to water pumps for cooling systems for internal combustion engines.

An object of this invention is to provide a rotary water pump for such cooling systems whose shaft bearings cannot be supplied with such excess amount of lubricant as will permit lubricant to enter the water circulating system. It has been found that a great proportion of cooling troubles in automobiles is due to the lubricant which is forced into the water pump bearings entering the water system and causing partially or completely clogged radiator passages or various small passages in the engine jacket. By means of this invention the water circulating system is absolutely protected against lubricant from the water pump entering in quantity therein even though high pressure devices be used in supplying lubricant to the pump bearings.

Further objects and advantages of the present invention will be apparent from the following description, reference being had to the accompanying drawing wherein a preferred embodiment of one form of the present invention is clearly shown.

In the drawing.

Similar reference characters refer to similar parts throughout the several views.

Figure 1:
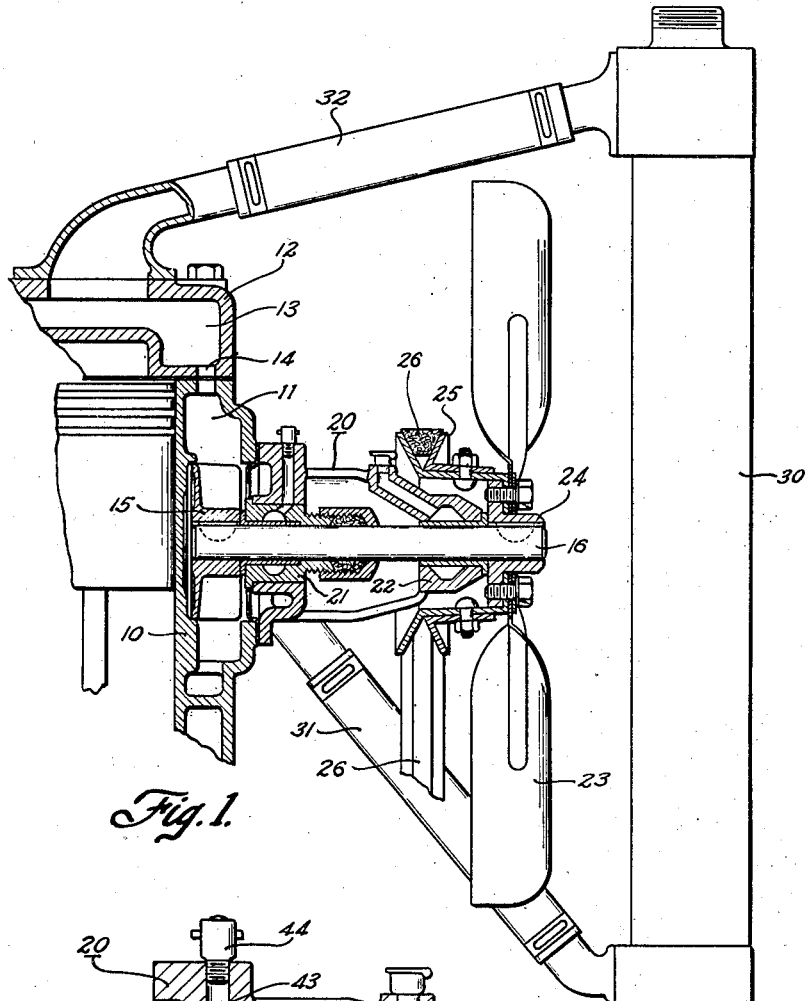
Fig. 1 shows a vertical section through the upper forward portion of an automobile engine and the radiator and hose connections thereto somewhat diagrammatically.
Figure 2:
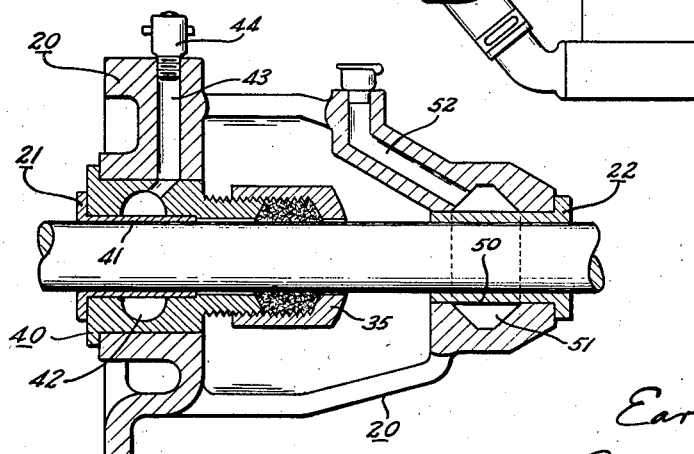
Fig. 2 is a detail view of the water pump shaft and bearings therefor.

Numeral 10 designates the cylinder block having a cooling jacket space 11 therein. The cylinder head 12 has jacket space 13 therein connected to jacket space 11 by passage 14.

A rotary impeller 15 fixed to driven shaft 16 is suitably mounted within the jacket space 11 by means of the bracket casting 20 which is rigidly fixed by suitable bolts or screws to the engine block 10. Bracket 20 has a bearing 21 adjacent the impeller 15 and a bearing 22 at the forward end of shaft 16 for suitably supporting said shaft 16. A cooling fan 23 is fixed to the forward end of shaft 16. A V-type drive pulley 25 is suitably fixed to the fan hub 24 so that both the fan 23 and water impeller 15 will be driven by the drive belt 26 engaging pulley 25.

When impeller 15 is rotated rapidly water is drawn through duct 31 from the bottom of radiator 30 to the pump inlet and passed out through a series of passages 14 to the cylinder head jacket 13 whence it passes via duct 32 to the top portion of the radiator.

This invention relates particularly to the means for properly lubricating the bearing 21 adjacent the water pump impeller 15 and yet avoiding possibility of lubricant being forced from said bearing adjacent shaft 16 into the water space from where it may be carried to all parts of the water circulating system. The cast metal bracket 20 has a bushing member 40 having a press fit therein. Within the bore of member 40 a porous metal bearing bushing 41 is rigidly fixed preferably by a pressed fit, which porous bushing 41 forms the bearing proper for shaft 16. Porous bushing 41 has an annular cavity 42 therearound which serves as a lubricant reservoir therefor. The lubricant, which may be either oil or grease, is absorbed by or is forced into the porous bushing 41 and thus the bearing surface of bushing 41 is automatically maintained properly lubricated with a film of lubricant. Cavity 42 is filled with lubricant through the duct 43 and fitting 44. Either oil or grease may be supplied to cavity 42 under high pressure if so desired, in order to more thoroughly force the lubricant into the pores of bushing 41 yet without any danger of forcing the lubricant entirely through the porous bushing 41 and thence along shaft 16 into the water circulating system. Bushing 41 is preferably of porous bronze containing a very large number of intercommunicating cells or pores. Such porous bronze per se is no part of this present invention and an example thereof is disclosed in Patent 1,642,347 issued September 13, 1927 to Williams et al. This invention relates to the use of such porous bronze bushings in combination with a water pump and water circulating system whereby lubricant is prevented from being forced from the water pump bearing into the water system.

Water leakage around shaft 16 is prevented by the packing gland 35 in the ordinary manner.

The front bearing 22 is also shown as having a porous metal bearing bushing 50 rigidly fixed in a bore in the bracket 20. Oil is supplied to the bearing surface from the oil reservoir 51 by capillary attraction of the porous metal material of which bushing 51 is made. Thus the reservoir may be filled with oil through duct 52 and it will be gradually and automatically supplied to the bearing surface only as needed.

While the form of embodiment of the present invention as herein disclosed, constitutes a preferred form, it is to be understood that other forms might be adopted, all coming within the scope of the claims which follow.

What is claimed is as follows:

1. In combination, an internal combustion engine having a cooling water jacket, a cooling radiator, ducts connecting said jacket and radiator, a rotary water impeller for circulating cooling water between said jacket and radiator, said impeller having a shaft, a bearing for said shaft adjacent said impeller having porous metal lining with capillary pores therein, and means for lubricating said bearing by supplying lubricant to the bearing surface only through said capillary pores of said porous lining, whereby lubricant is prevented from being forced into the water system.

2. In combination, an internal combustion engine having a cooling water jacket, a cooling radiator, ducts connecting said jacket and radiator, a rotary water impeller for circulating cooling water between said jacket and radiator, said impeller having a shaft, a bearing for said shaft adjacent said impeller, having a minutely porous metal lining, and means for supplying lubricant to the bearing surface only by passing lubricant through said porous lining, whereby to prevent possibility of lubricant being forced directly into said water circulating system.

3. In combination, an internal combustion engine having a cooling water jacket, a cooling radiator, ducts connecting said jacket and radiator, a rotary water impeller for circulating cooling water between said jacket and radiator, said impeller having a driven shaft fixed thereto, a bearing for said shaft adjacent said impeller, said bearing having a relatively thin, finely porous metal lining and a lubricant reservoir exterior to said lining for supplying lubricant through the porous lining to the bearing surface, whereby no excess lubricant can be forced from said bearing into the water circulating system.

In testimony whereof I hereto affix my signature.

EARL S. PATCH.